(12) United States Patent
Bampis et al.

(10) Patent No.: US 11,683,545 B2
(45) Date of Patent: *Jun. 20, 2023

(54) MACHINE LEARNING TECHNIQUES FOR DETERMINING QUALITY OF USER EXPERIENCE

(71) Applicant: NETFLIX, INC., Los Gatos, CA (US)

(72) Inventors: Christos Bampis, Los Gatos, CA (US); Zhi Li, Mountain View, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/700,231

(22) Filed: Mar. 21, 2022

(65) Prior Publication Data
US 2022/0217429 A1 Jul. 7, 2022

Related U.S. Application Data

(63) Continuation of application No. 16/401,066, filed on May 1, 2019, now Pat. No. 11,284,140.

(51) Int. Cl.
| | |
|---|---|
| *H04N 21/24* | (2011.01) |
| *H04N 21/25* | (2011.01) |
| *H04N 21/658* | (2011.01) |
| *H04N 21/4425* | (2011.01) |
| *H04N 21/6547* | (2011.01) |
| *H04N 21/475* | (2011.01) |

(52) U.S. Cl.
CPC ....... *H04N 21/2407* (2013.01); *H04N 21/251* (2013.01); *H04N 21/4425* (2013.01); *H04N 21/4756* (2013.01); *H04N 21/6547* (2013.01); *H04N 21/6582* (2013.01)

(58) Field of Classification Search
None
See application file for complete search history.

(56) References Cited

U.S. PATENT DOCUMENTS

| | | |
|---|---|---|
| 2014/0033242 A1 | 1/2014 | Rao et al. |
| 2014/0139687 A1 | 5/2014 | Adams et al. |

OTHER PUBLICATIONS

Duanmu et al., "A Quality-of-Experience Index for Streaming Video", IEEE Journal of Selected Topics in Signal Processing, DOI: 10.1109/JSTSP.2016.2608329, vol. 11, No. 1, Feb. 2017, pp. 154-166.

Bampis et al., "Learning to Predict Streaming Video QoE: Distortions, Rebuffering and Memory", arXiv:1703.00633, 2017, 12 pages.

(Continued)

*Primary Examiner* — James R Marandi
(74) *Attorney, Agent, or Firm* — Artegis Law Group, LLP

(57) ABSTRACT

In various embodiments, a quality of experience (QoE) prediction application computes a visual quality score associated with a stream of encoded video content. The QoE prediction application also determines a rebuffering duration associated with the stream of encoded video content. Subsequently, the QoE prediction application computes an overall QoE score associated with the stream of encoded video content based on the visual quality score, the rebuffering duration, and an exponential QoE model. The exponential QoE model is generated using a plurality of subjective QoE scores and a linear regression model. The overall QoE score indicates a quality level of a user experience when viewing reconstructed video content derived from the stream of encoded video content.

20 Claims, 5 Drawing Sheets

(56) References Cited

OTHER PUBLICATIONS

Eswara et al., "A Continuous QoE Evaluation Framework for Video Streaming over HTTP", IEEE Transactions on Circuits and Systems for Video Technology, vol. 28, No. 11, Nov. 2018, pp. 3236-3250.

Menkovski et al., "Online QoE Prediction", 2010 Second International Workshop on Quality of Multimedia Experience (QoMEX), Jun. 1, 2010, pp. 118-123.

Juluri et al., "Measurement of Quality of Experience of Video-on-Demand Services: A Survey", IEEE Communication Surveys & Tutorials, vol. 18, No. 1, 2016, pp. 401-418.

MACHINE LEARNING TECHNIQUES FOR DETERMINING QUALITY OF USER EXPERIENCE

CROSS-REFERENCE TO RELATED APPLICATIONS

This application is a continuation of the co-pending U.S. patent application titled, "MACHINE LEARNING TECHNIQUES FOR DETERMINING QUALITY OF USER EXPERIENCE," filed on May 1, 2019, and having Ser. No. 16/401,066. The subject matter of the related application is hereby incorporated herein by reference.

BACKGROUND

Field of the Various Embodiments

Embodiments of the present invention relate generally to computer science and video technology and, more specifically, to machine learning techniques for determining quality of user experience.

Description of the Related Art

A typical video streaming service provides access to a library of video content that can be viewed on a range of different client devices, where each client device usually connects to the video streaming service under different connection and network conditions. To efficiently deliver video content to client devices, the video streaming service provider encodes the video content and then streams the encoded video content to the client devices. Each client device generates reconstructed video content based on the "stream" of encoded video content and displays the reconstructed video content to users. Variations in the quality of encoded video content used for streaming impact the quality of experience for users when viewing the reconstructed video content. For this reason, one or more visual quality metrics that predict the quality of encoded video content are often used to estimate the quality of experience for users.

One drawback of using visual quality metrics to estimate the quality of experience of users is that visual quality metrics relate to the quality of the encoded video content and do not reflect playback issues related to network bandwidth or throughput. In particular, playback interruptions known as "rebuffering events" can occur when the streaming bitrate exceeds the available network throughput. During a rebuffering event, the client device usually displays either a frozen frame or a frozen frame superimposed with an indication of the rebuffering event, such as a spinner. Although the quality of experience for users is degraded, the visual quality score (e.g., value for a visual quality metric) for the encoded video content used for streaming is unchanged.

Some quality of experience ("QoE") models have been developed that attempt to predict the quality of experience of users when viewing video content that has been encoded and streamed. A typical QoE model reflects both the quality of the encoded video content used for streaming and the impact of any rebuffering events on the overall quality of experience. However, the existing QoE models have deficiencies that have limited adoption by video streaming services and clients. In particular, a typical QoE model has numerous parameters that are determined arbitrarily or via machine learning techniques and have no intuitive meanings. Without intuitive understanding or meaning, the QoE models are not a good way to evaluate something as individualized and subjective as the quality of a user experience. Further, statistical analysis has shown that many QoE models lack robustness and are unable to accurately predict the quality of experience across a broad range of encoded video content and rebuffering events These QoE models are therefore not often used.

As the foregoing illustrates, what is needed in the art are more effective techniques for predicting the quality of experience of users when viewing video content that has been encoded and streamed.

SUMMARY

One embodiment of the present invention sets forth a computer-implemented method for predicting the quality of experience associated with streams of encoded video content. The method includes computing a first visual quality score associated with a stream of encoded video content; determining a first rebuffering duration associated with the stream of encoded video content; and computing an overall quality of experience (QoE) score associated with the stream of encoded video content based on the first visual quality score, the first rebuffering duration, and an exponential QoE model that is generated using a plurality of subjective QoE scores and a linear regression model, where the overall QoE score indicates a quality level of a user experience when viewing reconstructed video content derived from the stream of encoded video content.

At least one technical advantage of the disclosed techniques relative to the prior art is that the exponential QoE model predicts in a more intuitive fashion the overall quality of experience for users when viewing video content that has been encoded and streamed. In particular, when encoded video content is streamed under non-ideal connection conditions, the QoE score for the viewing session reflects the inherent tradeoff between the visual quality of the played back video content and the duration of rebuffering events, if any, that occur during the viewing session. In addition, the exponential QoE model has a lower bound, each of the parameters of the exponential QoE model has an intuitive meaning, and the accuracy and robustness of the exponential QoE model can be verified and quantified via statistical analysis. Accordingly, the exponential QoE model described herein has broader applicability, as a practical matter, than many prior art QoE models. These technical advantages represent one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
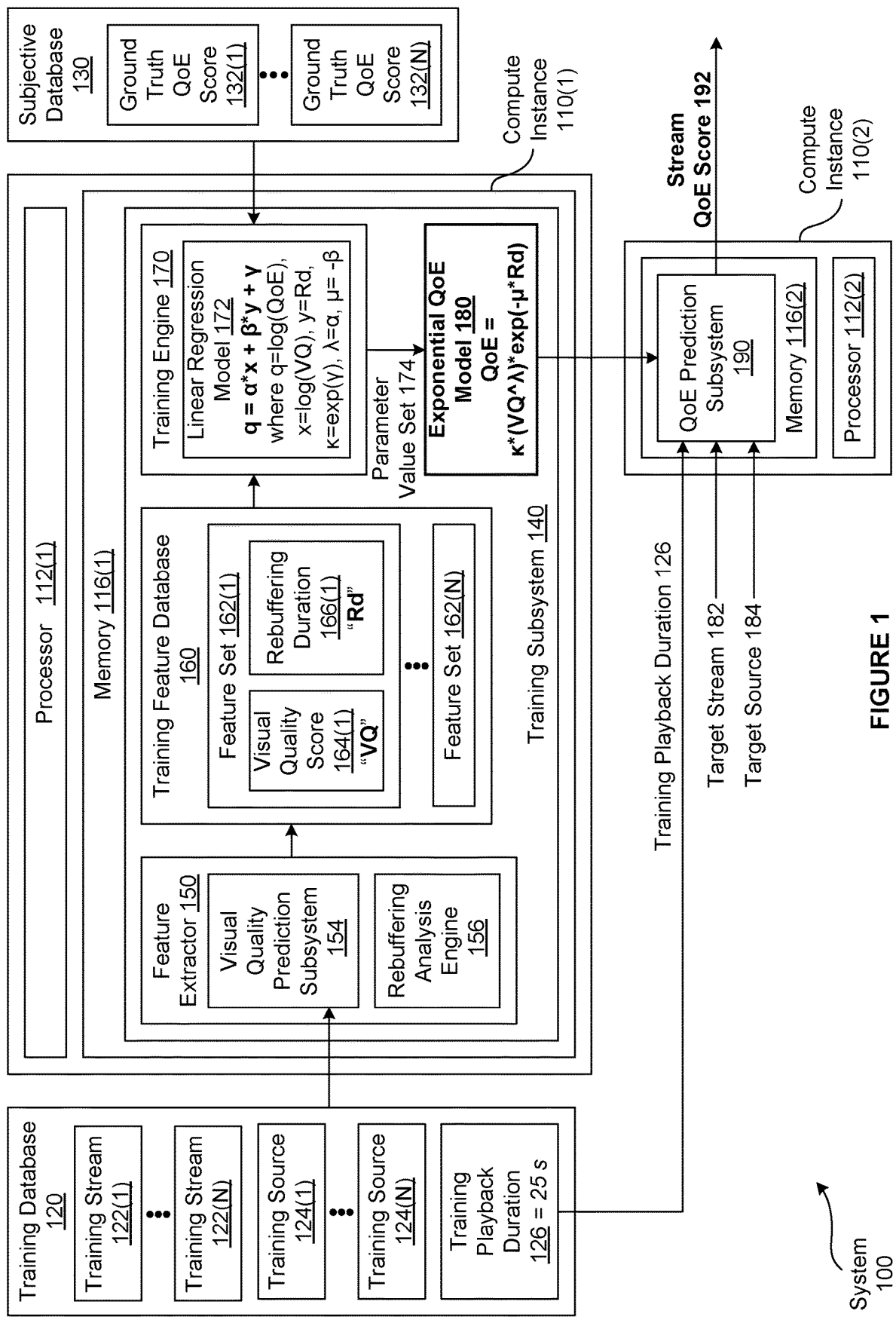
FIG. 1 is a conceptual illustration of a system configured to implement one or more aspects of the present invention.

In the following description, numerous specific details are set forth to provide a more thorough understanding of the various embodiments. However, it will be apparent to one of skilled in the art that the inventive concepts may be practiced without one or more of these specific details.

A typical video streaming service provides access to a library of video content that can be viewed on a range of different client devices, where each client device usually connects to the video streaming service under different connection and network conditions. To efficiently deliver video content to client devices, the video streaming service provider encodes the video content and then streams the encoded video content to the client devices. Each client device generates reconstructed video content based on the "stream" of encoded video content and displays the reconstructed video content to users. Because of variations in the quality of encoded video content used for streaming, a typical video streaming service attempts to increase the quality of experience of users when viewing the reconstructed video content. In particular, many video streaming services optimize encoding and streaming operations based on one or more visual quality metrics that predict the quality of encoded video content. Examples of visual quality metrics include peak signal-to-noise ratio ("PSNR"), Video Multimethod Assessment Fusion ("VMAF"), multi-scale structural similarity index ("MS-SSIM"), etc.

One drawback of using visual quality metrics to optimize encoding and streaming operations is that visual quality metrics relate to the quality of the encoded video content and do not reflect playback issues related to network bandwidth or throughput. Consequently, optimizing a visual quality score (e.g., value for a visual quality metric) does not necessarily optimize the overall quality of experience for users when viewing video content that has been encoded and streamed. In particular, playback interruptions known as "rebuffering events" can occur when the streaming bitrate exceeds the available network throughput. During a rebuffering event, the client device usually displays either a frozen frame or a frozen frame superimposed with an indication of the rebuffering event, such as a spinner. Although the quality of experience for users is degraded, the visual quality score (e.g., value for a visual quality metric) for the encoded video content used for streaming is unchanged.

For example, if the same encoded video content was received by a client device "A" as an uninterrupted stream and by a client device "B" as a distorted stream that included a twenty-second rebuffering event, then the visual quality scores for the two streams would be identical. However, the quality of experience for users viewing the reconstructed video content via the client device A would be higher than the quality of experience for users viewing the reconstructed video content via the client device B.

Some conventional quality of experience ("QoE") models have been developed that attempt to predict the quality of experience of users when viewing video content that has been encoded and streamed. A conventional QoE model attempts to reflect both the quality of the encoded video content used for streaming and the impact of any rebuffering events on the overall quality of experience. However, conventional QoE models have deficiencies that have limited adoption by video streaming services and clients. In particular, a typical conventional QoE model has numerous parameters that are determined arbitrarily or via machine learning techniques and have no intuitive meanings. Without intuitive understanding or meaning, conventional QoE models are not a good way to evaluate something as individualized and subjective as the quality of a user experience.

Further, statistical analysis has shown that many conventional QoE models are overfitted or underfitted. An overfitted QoE model has more parameters than are necessary to accurately model the quality of experience and instead models idiosyncrasies in the data used to develop the QoE model. For example, during machine learning operations, an overfitted QoE model typically "memorizes" the patterns associated with training data rather than "learning" to generalize from the patterns. By contrast, an underfitted QoE model lacks terms or parameters that are required to accurately model QoE. For example, linear QoE models have no lower bound, and a meaningful measure of QoE has a lower bound. Overfitted and underfitted QoE models are therefore not often used.

With the disclosed techniques, however, a more intuitive exponential QoE model can be used to accurately compute the QoE of users when viewing video content that has been encoded and streamed. In one embodiment, the exponential QoE model is an exponential function that expresses a QoE score for a stream of encoded video content based on a visual quality score for the encoded video content and the total duration of any rebuffering events. The exponential QoE model has three intuitive parameters: a gain factor "$\kappa$", a non-linearity visual quality factor "$\lambda$", and a rebuffering factor "$\mu$".

To determine the parameter values for the exponential QoE model, the exponential QoE model is recast as a linear regression model. A training subsystem performs machine learning operations on the linear regression model based on a visual quality model, a training database, and a subjective database to generate a trained linear regression model. The training database includes training streams that vary in level of visual quality as well as number and duration of rebuffering events. The subjective database includes ground truth QoE scores computed based on personalized rankings for overall quality of experience obtained from human subjects when viewing reconstructed video content derived from the training streams. The training subsystem computes the parameter values of the exponential QoE model based on the learned parameter values of the trained linear regression model, thereby indirectly training the exponential QoE model.

Subsequently, a QoE prediction subsystem computes QoE scores for a target stream of encoded video content based on the associated target source of video content, the exponential QoE model, and a training playback duration. The training playback duration specifies the approximate duration of each of the training sources from which the training streams were derived and thus for which the exponential QoE model is fine-tuned. First, the QoE prediction subsystem determines overlapping stream chunks of the target stream and corresponding overlapping source chunks of the target source, where each chunk has a duration approximately equal to the training playback duration. The QoE prediction subsystem then computes a chunk QoE score for each stream chunk based on the source chunks, the stream chunks, the exponentiation QoE model, and the visual quality metric associated with the exponential QoE model. Finally, the QoE prediction subsystem aggregates the chunk QoE scores to generate a stream QoE score that predicts the overall quality of experience for users when viewing the reconstructed content derived from the target stream.

At least one technical advantage of the disclosed techniques relative to the prior art is that the exponential QoE model predicts in a more intuitive fashion the overall quality of experience for users when viewing video content that has been encoded and streamed. In particular, when encoded video content is streamed under non-ideal connection conditions, the QoE score for the viewing session reflects the inherent tradeoff between the visual quality of the played back video content and the duration of rebuffering events, if any, that occur during the viewing session. Using the exponential QoE model, a video streaming service or client can determine whether increasing the total duration of rebuffering by x % to obtain a y % increase in a VMAF score would increase the overall quality of experience for a viewing session. In addition, the exponential QoE model has a lower bound, each of the parameters of the exponential QoE model has an intuitive meaning, and the accuracy and robustness of the exponential QoE model can be verified and quantified via statistical analysis. Advantageously, optimizing certain encoding and streaming operations based on the exponential QoE model instead of or in addition to visual quality models can increase the overall quality of experience for users. These technical advantages represent one or more technological advancements over prior art approaches.

System Overview

FIG. 1 is a conceptual illustration of a system 100 configured to implement one or more aspects of the present invention. As shown, the system 100 includes, without limitation, any number of compute instances 110, a training database 120, a subjective database 130, a target stream 182, and a target source 184. In alternate embodiments, the system 100 may include any number of each of the training database 120, the subjective database 130, the target stream 182, and the target source 184. For explanatory purposes, multiple instances of like objects are denoted with reference numbers identifying the object and parenthetical numbers identifying the instance where needed. In some embodiments, any number of the components of the system 100 may be distributed across multiple geographic locations or included in one or more cloud computing environments (i.e., encapsulated shared resources, software, data, etc.) in any combination.

As shown, each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110. In alternate embodiments, each of the compute instances 110 may include, without limitation, any number of processors 112 and any number of memories 116 in any combination. In particular, any number of compute instances 110 (including one) may provide a multiprocessing environment in any technically feasible fashion.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

Each of the compute instances 110 is configured to implement one or more applications (also referred to herein as "software applications") or subsystems of applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In general, the compute instance 110(1) is configured to perform machine learning operations to generate an exponential quality of experience (QoE) model 180 that institutes a QoE metric. The QoE metric measures the quality of experience of users when viewing video content that has been encoded and streamed. In a complementary fashion, the compute instance 110(2) is configured to predict values of the QoE metric, referred to herein as QoE scores, for streams of encoded video content based on the exponential QoE model 180.

As described previously herein, visual quality metrics that predict the quality of encoded video content are often used to estimate the quality of experience for users. One drawback of using visual quality metrics to estimate the quality of experience of users is that visual quality metrics relate to the quality of the encoded video content and do not reflect rebuffering events. Some conventional QoE models have been developed that reflect both the quality of the encoded video content used for streaming and the impact of any rebuffering events on the overall quality of experience. However, conventional QoE models typically predict the QoE in a non-intuitive fashion and/or lack robustness. Conventional QoE models are therefore not often used.

Implementing the Exponential QoE Model

To address the above problems, the system 100 includes, without limitation, a training subsystem 140 and a QoE prediction subsystem 190. The training subsystem 140 generates the exponential QoE model 180, and the QoE prediction subsystem 190 computes QoE scores based on streams of encoded video content and the exponential QoE model 180. Each QoE score is a value for a QoE metric that is instituted by the exponential QoE model 180. The training subsystem 140 resides in the memory 116(1) and executes on the processor 112(1) of the compute instance 110(1), and the QoE prediction subsystem 190 resides in the memory 116(2) and executes on the processor 112(2) of the compute instance 110(2). The QoE prediction subsystem 190 is also referred to herein as the "QoE prediction application" 190.

In operation, the training subsystem 140 generates the exponential QoE model 180 based on a training database 120 and a subjective database 130. The training database 120 includes, without limitation, a training playback duration 126, any number of training sources 124, and any number of training streams 122 derived from the training sources 124. The training playback duration 126 specifies the time (e.g., 25 seconds) required to playback the frames included in a training-sized portion of video content under ideal playback conditions. The number of frames in a training-sized portion of video content is the product of the frame rate (e.g., 30 frames per second) and the training playback duration 126.

Each of the training sources 124 includes, without limitation, an approximately training-sized portion of any type of video content. For example, if the training playback duration 126 is 25 seconds, then the training source 124(1) could include a 25 second portion of a movie, the training source 124(2) could include a 25 second portion of an episode of a television program, the training source 124(3) could include a 24 second portion of a music video, the training source 124(4) could include a 26 second video clip, etc.

As referred to herein and in the context of durations, "approximately" may be defined and/or enforced (e.g., by a software application) based on any criterion that specifies an acceptable range of durations or acceptable delta(s) in any technically feasible fashion. For instance, in some embodiments, the training playback duration 126 may be associated with an acceptable duration range (e.g., 24-26 seconds) and the duration of the training sources 124 may vary within the acceptable duration range.

Each of the training streams 122 includes, without limitation, encoded video content derived from one of the training sources 124 and any number of rebuffering events (not shown in FIG. 1) that interrupt the playback of the frames of the encoded video content. For explanatory purposes only, the training stream 122($x$) is derived from the training source 124($x$). However, more than one of the training streams 122 may be derived from a single training source 124. In general, the training database 120 may include a single copy of a particular training source 124, and the training database 120 may associate more than one of the training streams 122 with the training source 124 in any technically feasible fashion. For instance, in some embodiments, the training stream 122($x$) may be associated with the training source 124($x$) and the training stream 122($y$) may be associated with the training source 124($y$) that is a link to the training source 124($x$).

As persons skilled in the art will recognize, reconstructed video content derived from the training stream 122($x$) includes potentially distorted versions of each of the frames included in the training source 124($x$) that are interrupted by any rebuffering events included in the training stream 122($x$). The distortions in the reconstructed frames arise from the encoding process (e.g., lossy data compression techniques that eliminate selected information). The rebuffering events indicate stalling that occurs when the playback conditions are not ideal (e.g., when the streaming bitrate exceeds the available network throughput). Each of the rebuffering events is associated with a frame and a duration.

More precisely, if the rebuffering event is associated with the frame x and a duration of 5 seconds, then the client device displaying the reconstructed video content typically re-displays the frame x for 5 seconds and/or an indication of rebuffering before displaying the frame (x+1). As referred to herein, the "viewing" duration of the training stream 122($x$) is equal to the sum of the playback duration of the training source 124($x$) (i.e., the training playback duration 126) and the total duration of the rebuffering events included in the training stream 122($x$). By contrast, the playback duration of the training stream 122($x$) is equal to the playback duration of the training source 124($x$).

In general, the training streams 122 included in the training database 120 represent a wide range of resolutions, encoding parameters, and rebuffering events. For example, the training stream 122(1) could include a 1920×1080 version of the training source 124(1) encoded at a bitrate of twenty megabits per second ("mbps") in addition to a rebuffering event of 5 seconds associated with the $360^{th}$ frame (e.g., the $360^{th}$ frame is frozen for 5 seconds). By contrast, the training stream 122(2) could include a 1280× 720 version of the training source 124(2) encoded at a bitrate of 2 mbps in addition to a first rebuffering event of 2 seconds associated with the $10^{th}$ frame, a second rebuffering event of 3 seconds associated with $560^{th}$ frame, and a third rebuffering event of 1 second associated with the $740^{th}$ frame.

The subjective database 130 includes, without limitation, ground truth QoE scores 132(1)-132(N), where the total number of the ground truth QoE scores 132 is equal to the total number of the training streams 122. The ground truth QoE score 132($x$) is associated with the training stream 122($x$) and is an aggregation of personalized ratings. More specifically, as human subjects watch the reconstructed video content derived from the training stream 122($x$) on client devices, the human subjects personally rate the quality of experience. Notably, to ensure that the personalized ratings accurately reflect the viewing experience for a typical user when viewing video content that has been encoded and streamed, the human subjects are aware that playback interruptions may occur. The personalized ratings are then aggregated in any technically feasible fashion to generate the ground truth QoE score 132($x$). The ground truth QoE score 132 is also referred to herein as a "subjective QoE score." In some embodiments, to ensure consistency, the training database 120 includes the reconstructed video content for each of the training steams 122.

As shown, the training subsystem 140 includes, without limitation, a feature extractor 150, a training feature database 160, a training engine 170, and the exponentiation QoE model 180. The feature extractor 150 generates the training feature database 160 based on the training database 120. For each training stream 122($x$) included in the training database 120, the feature extractor 150 generates a feature set 162($x$) that is included in the training feature database 160. Accordingly, the training feature database 160 includes, without limitation, the feature sets 162(1)-162(N). The feature extractor 150 includes, without limitation, a visual quality prediction subsystem 154 and a rebuffering analysis engine 156. In a complementary fashion, each of the feature sets 162 includes, without limitation, a visual quality score 164 that is symbolized as "VQ" and a rebuffering duration 166 that is symbolized as "Rd."

The visual quality prediction subsystem 154 computes the visual quality score 164($x$) included in the feature set 162($x$) based on the training stream 122($x$) and the training source 124($x$). The visual quality score 164($x$) is a value for a visual quality metric associated with the visual quality prediction subsystem 154 and represents an average quality of the frames of encoded video content included in the training stream 122($x$). Importantly, the visual quality score 164($x$) of the training stream 122(x) does not reflect any rebuffering events included in the training stream 122(x). Examples of video quality metric include, without limitation, Video Multimethod Assessment Fusion (VMAF), multi-scale structural similarity index (MS-SSIM), etc. The visual quality prediction subsystem 154 may compute the visual quality scores 164 in any technically feasible fashion that disregards rebuffering events.

In some embodiments and for some video quality metrics, the visual quality prediction subsystem 154 computes the visual quality score 164(x) based, at least in part, on reconstructed video content derived from the training stream 122(x). In such embodiments, the visual quality prediction subsystem 154 operates on the same reconstructed video content, including any relevant upsampling or downsampling, that the human subjects viewed when generating the personalized ratings that contributed to the ground truth QoE score 132(x).

In general, the visual quality prediction subsystem 154 computes the visual quality score 164(x) based on comparing each frame of the training source 124(x) to the playback-aligned frame of the training stream 122(x). As referred to herein, the frame A included in a discrete portion of video content and the frame B included in a discrete portion of encoded video content derived from the discrete portion of video content are "playback-aligned" when the frame B is an encoded version of the frame A. As persons skilled in the art will recognize, if the training stream 122(x) does not include any rebuffering events, then the $y^{th}$ frame of the training stream 122(x) is playback-aligned to the $y^{th}$ frame of the training source 124(x). In alternate embodiments, the visual quality prediction subsystem 154 may implement a visual quality metric based solely on encoded video content without using the original video content from which the encoded video content was derived, and the techniques described herein are modified accordingly.

The rebuffering analysis engine 156 computes the rebuffering duration 166(x) included in the feature set 162(x) based on the training stream 122(x). More specifically, the rebuffering analysis engine 156 sets the rebuffering duration 166(x) equal to the duration of all of the rebuffering events included in the training stream 122(x). In alternate embodiments, the rebuffering analysis engine 156 may compute rebuffering values for any number and type of rebuffering characteristics instead of or in addition to the rebuffering duration 166. The rebuffering analysis engine 156 may then store any number of the rebuffering values as feature values in the feature set 162(x) and/or compute any number of composite feature values based on the rebuffering values and then store the composite feature values in the feature set 162(x). For instance, in some embodiments, the rebuffering analysis engine 156 computes a composite feature value based on the rebuffering duration 166(x), the time that has elapsed since the last rebuffering event, and the total number of rebuffering events. The rebuffering analysis engine 156 then stores the composite feature value instead of the rebuffering duration 166(x) in the feature set 162(x).

The training engine 170 generates a parameter value set 174 for the exponential QoE model 180 based on the training feature database 160, the subjective database 130, and a linear regression model 172. In general, the exponential QoE model 180 expresses the QoE score of a discrete portion of encoded video content having a playback duration approximately equal to the training playback duration 126 as a function of the feature set 162 associated with the portion of encoded video content and a parameter set (not shown). The parameter set includes, without limitation, a gain factor symbolized as "κ", a non-linearity visual quality factor symbolized as "λ", and a rebuffering factor symbolized as "μ". As shown, the exponential QoE model 180 can be expressed as the following equation (1):

$$QoE = \kappa * (VQ^\wedge \lambda) * \exp(-\mu * Rd) \qquad (1)$$

To enable efficient training, the exponential QoE model 180 is recast as the linear regression model 172. The linear regression model 172 can be expressed as the following equations 2(a) and 2(b):

$$q = \alpha * x + \beta * y + \gamma \qquad (2a)$$

$$q = \log(QoE), x = \log(VQ), y = Rd, \qquad (2b)$$
$$\kappa = \exp(\gamma), \lambda = \alpha, \text{ and } \mu = -\beta$$

In operation, the training engine 170 may implement any number and type of machine learning operations to learn the parameter values for the trained linear regression model 172 that map each feature set 162(x) to the corresponding ground truth score 132(x). For instance, in some embodiments, the training engine 170 implements a linear regression algorithm (e.g., ordinary least squares, gradient descent optimization, etc.) to learn the parameter values for the trained linear regression model 172. As persons skilled in the art will recognize, the training subsystem 140 and/or the training engine 170 may implement any number of techniques to ensure the validity of mathematical operations (e.g., log). For instance, in some embodiments, the training engine 170 adds a small value to each of the visual quality scores 164 and the ground truth QoE scores 132 that is equal to zero.

The training engine 170 computes the parameter value set 174 based on the parameter values "learned" and included in the trained linear regression model 172 and the equations 2(b). Subsequently, the training subsystem 140 generates the exponential QoE model 180 having the parameter value set 174. In this fashion, the exponential QoE model 180 is indirectly and efficiently trained to compute a QoE score for a given feature set 162 based on both quality issues arising from the level of encoding as well as quality issues arising from rebuffering events. Finally, the training subsystem 140 transmits the exponential QoE model 180 and the training playback duration 126 associated with the training database 120 to any number of software applications the QoE prediction subsystem 190) for use in predicting QoE scores for streams of encoded video content.

Advantageously, the exponential QoE model 180 has a lower bound and each of the parameters of the exponential QoE model 180 have an intuitive meaning. Further, the exponential QoE model 180 is relatively simple (i.e., only three parameters are used to fully describe the exponential QoE model 180) and can be computed efficiently. In some embodiments, VQ is a value for VMAF which is linearized based on visual quality ratings assigned by subjects viewing reconstructed video content without playback interruptions. The non-linearity visual quality factor enables further linearization based on the ground truth QoE scores 132. Because of the similar derivation methodologies, the likelihood that video streaming services and clients using VMAF scores adopt the exponentiation QoE model 180 is increased.

In alternate embodiments, the rebuffering duration (Rd) 166 in the exponential QoE model 180 may be replaced with any type of rebuffering-related feature. For instance, in some embodiments, the rebuffering duration 166 in the exponential QoE model 180 is replaced with a composite feature that is a function of the rebuffering duration 166, the time that has elapsed since the last rebuffering event, and the total number of rebuffering events.

As shown, the QoE prediction subsystem 190 generates the stream QoE score 192 based on the exponential QoE model 180, the target stream 182, the target source 184, and the training playback duration 126. The stream QoE score 192 predicts the overall quality of experience for users during a "viewing session" in which the users view the reconstructed video content derived from the target stream 182. The stream QoE score 192 reflects the inherent tradeoff between the visual quality of the played back video content (i.e., the reconstructed video content) and the duration of rebuffering events, if any, that occur during the viewing session.

The target source 184 includes, without limitation, any amount and type of video content. The target stream 182 includes, without limitation, encoded video content derived from the target source 184 and any number of rebuffering events. The playback duration of the target stream 182 is equal to the playback duration of the target source 184, and the viewing duration of the target stream 182 is equal to the sum of the playback duration and the total duration of the rebuffering events included in the target stream 182.

Because the exponential QoE model 180 is trained based on the training streams 122 and the training sources 124 that each has a playback duration approximately equal to the training playback duration 126, the exponential QoE model 180 is optimized for the training playback duration 126. For this reason, the QoE prediction subsystem 190 computes chunk QoE scores (not shown in FIG. 1) based on the exponential QoE model 180 and overlapping chunks of each of the target stream 182 and the target source 184, where each chunk has a playback duration approximately equal to the training playback duration 126. Subsequently, the QoE prediction subsystem 190 aggregates the chunk QoE scores to compute the stream QoE score 192.

Finally, the QoE prediction subsystem 190 transmits the stream QoE score 192 to any number of software applications for evaluation of the target stream 182. Although not shown, the QoE prediction subsystem 190 may compute the stream QoE scores 192 for any number of the target streams 182. The QoE prediction subsystem 190 is described in greater detail in conjunction with FIG. 2.

Advantageously, the exponential QoE model 180 is amenable to statistical analysis techniques that can be used to verify that the exponential QoE model 180 is neither overfitted nor underfitted and to quantify the accuracy of the stream QoE scores 192 for any number of the target streams 182. For instance, in alternate embodiments, the training engine 170 and the QoE prediction subsystem 190 are supplemented with, respectively, a bootstrapping engine and a confidence engine. The training engine 170 generates the exponential QoE model 180 as described previously herein.

The bootstrapping engine performs resampling with replication operations on the training feature database 160 and/or the subjective database 130 to generate any number of resampled datasets. Each of the resampled datasets is associated with a different subset of the training streams 122 and/or a different subset of the personalized QoE ratings that contribute to the ground truth QoE scores 132. For each of the resampled datasets, the training engine performs machine learning operations based on the resampled dataset and the linear regression model 172 to generate a different bootstrap exponential QoE model.

Subsequently, the QoE prediction subsystem 190 computes the stream QoE score 192 for the target stream 182 based on the exponential QoE model 180 as described previously herein. For each of the bootstrap exponential QoE models, the confidence application generates a different bootstrap stream QoE score for the target stream 182 based on the bootstrap exponential QoE model. The confidence application then generates a score distribution that includes, without limitation, the bootstrap stream QoE scores. Subsequently, the confidence application computes a confidence interval based on the score distribution and a confidence level. Each of the score distribution and the confidence interval quantifies the accuracy of the stream QoE score 192.

Note that the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques Further, in various embodiments, any number of the techniques disclosed herein may be implemented while other techniques may be omitted in any technically feasible fashion.

It will be appreciated that the system 100 shown herein is illustrative and that variations and modifications are possible. For example, the functionality provided by the training subsystem 140 and the QoE prediction subsystem 190 as described herein may be integrated into or distributed across any number of software applications (including one), and any number of components of the system 100. Further, the connection topology between the various units in FIG. 1 may be modified as desired.

Computing QoE Scores

Figure 2:
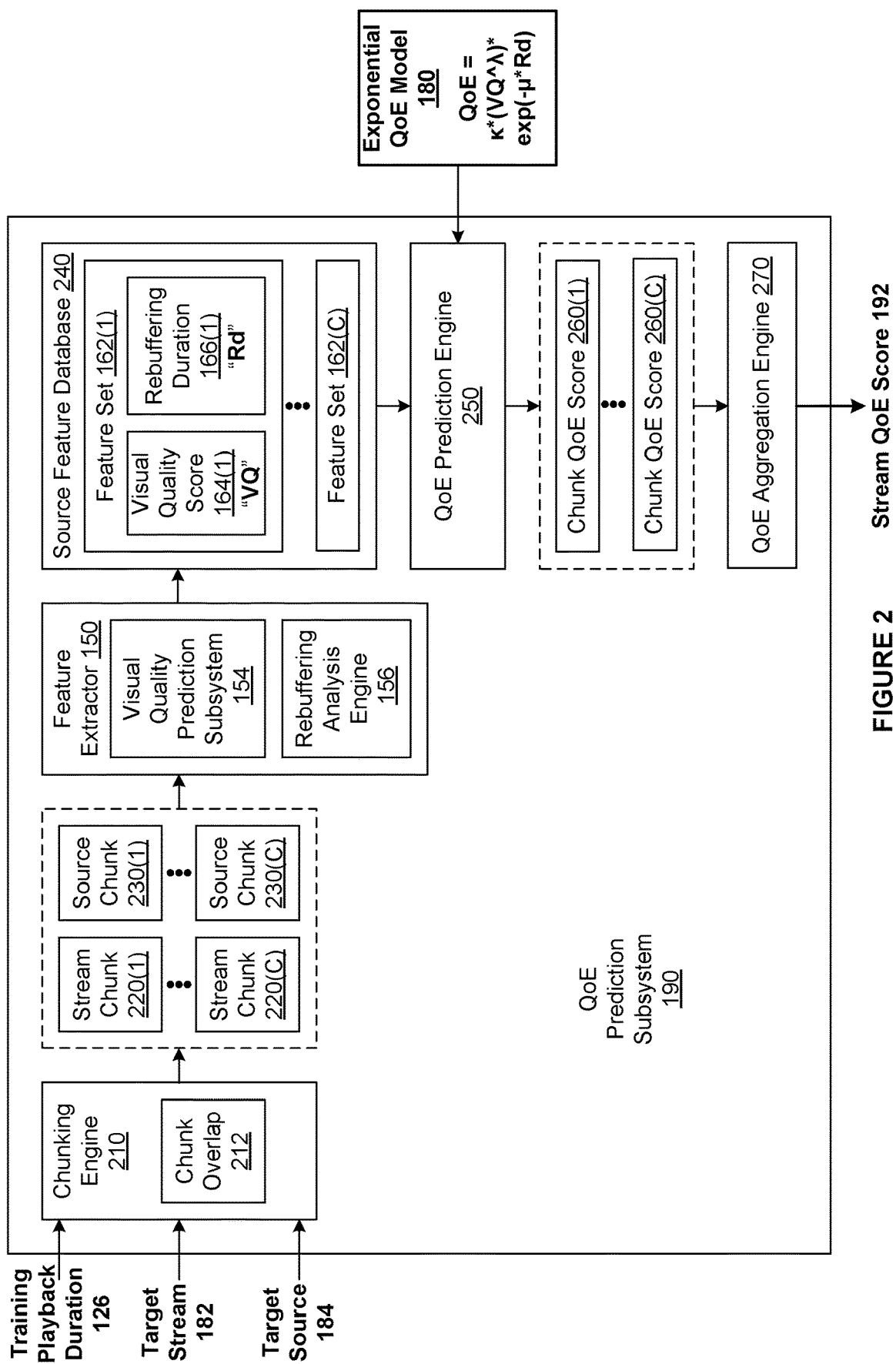
FIG. 2 is a more detailed illustration of the quality of experience (QoE) prediction subsystem of FIG. 1, according to various embodiments of the present invention.

FIG. 2 is a more detailed illustration of the quality of experience (QoE) prediction subsystem 190 of FIG. 1, according to various embodiments of the present invention. As shown, the QoE prediction subsystem 190 includes, without limitation, a chunking engine 210, stream chunks 220(1)-220(C), source chunks 230(1)-230(C), the feature extractor 150, a source feature database 240, a QoE prediction engine 250, chunk QoE scores 260(1)-260(C) and a QoE aggregation engine 270.

The chunking engine 210 includes, without limitation, a chunk overlap 212 that specifies a duration of time (e.g., 5 seconds) or a number of frames (e.g., 1 frame) over which sequential chunks overlap. The chunking engine 210 determines the stream chunks 220 and the source chunks 230 based on the training playback duration 126, the chunk overlap 212, and, respectively, the target stream 182 and the target source 184. The chunking engine 210 ensures that each of the stream chunks 220 includes a portion of the target stream 182 having a playback duration approximately equal to the training playback duration 126, and that immediately adjacent stream chunks 220(x) overlap by a playback duration equal to the chunk overlap 212. Accordingly, the viewing duration of each of the stream chunks 220(x) is approximately equal to the sum of the training playback duration 126 and the total duration of the rebuffering events included in the stream chunk 220(x). Together, the stream chunks 220 span the entire target stream 182.

In a similar fashion, the chunking engine 210 ensures that each of the source chunks 230 includes a portion of the target source 184 having a playback duration approximately equal to the training playback duration 126, and that immediately adjacent source chunks 230 overlap by the chunk overlap 212. Notably, the stream chunk 220(x) includes an encoded version of each of the frames included in the source chunk 230(x) in addition to the rebuffering events associated with the encoded versions of the frames.

In alternate embodiments, the chunking engine 210 may generate the stream chunks 220 and the source chunks 230 based on viewing duration instead of playback duration, and the techniques described herein are modified accordingly. For instance, in some embodiments, the chunking engine 210 may generate overlapping stream chunks 220 that each has a viewing duration approximately equal to the training playback duration 126. For each of the stream chunks 220(x), the chunking engine 210 may then generate the source chunk 230(x) that includes the video content from which the frames of the stream chunk 220(x) are derived. The playback duration of each of the source chunks 230(x) is therefore approximately equal to the difference between the training playback duration 126 and the sum of the rebuffering events included in the stream chunks 220(x).

The feature extractor 150 generates the source feature database 240 based on the stream chunks 220 and the source chunks 230. For each stream chunk 220(x), the feature extractor 150 generates the feature set 162(x) that is included in the source feature database 240. As a result, the source feature database 240 includes, without limitation, the feature sets 162(1)-162(C), where C is the total number of the stream chunks 220. The functionality of the feature extractor 150 was described in detail in conjunction with FIG. 1. In particular, the visual quality prediction subsystem 154 generates the visual quality score 164(x) for the stream chunk 220(x) based on the playback-aligned frames of the stream chunk 220(x) and the source chunk 230(x), disregarding any rebuffering events. The rebuffering analysis engine 156 sets the rebuffering duration 166(x) equal to the duration of all of the rebuffering events included in the stream chunk 220(x).

For each of the feature sets 162(x) included in the source feature database 240, the QoE prediction engine 250 generates the chunk QoE score 260(x) that predicts the quality of experience for users when viewing the reconstructed video content derived from the stream chunk 220(x). In operation, the QoE prediction engine 250 provides the feature set 162(x) as an input to the exponential QoE model 180 and, in response, the exponential QoE model 180 maps the feature set 162(x) to the chunk QoE score 260(x).

The QoE aggregation engine 270 aggregates the chunk QoE scores 260(x) to generate the stream QoE score 192 that predicts the overall quality of experience for users when viewing the reconstructed video content derived from the target stream 182. The stream QoE score 192 is also referred to herein as the "overall QoE score 192." The QoE aggregation engine 270 may aggregate the chunk QoE scores 260 in any technically feasible fashion and may tailor the aggregation technique based on the chunk overlap 212.

For instance, in some embodiments, the chunk overlap 212 is one frame. First, the QoE aggregation engine 270 computes the total number of frames included in each of the stream chunks 220 and the source chunks 230 (symbolized as "W") based on the training playback duration 126 and the frame rate. With the exception of a set of frames at the start of the target stream 182 and a set of frames at the end of the target stream 182, each of the frames is included in W of the stream chunks 220 and W of the source chunks 230 and, consequently, contribute to W of the chunk QoE scores 260. The QoE aggregation engine 270 sets the stream QoE score 192 to the average of the chunk QoE scores 260. With the exception of a set of frames at the start of the target stream 182 and a set of frames at the end of the target stream 182, each of the frames contributes equally to the stream QoE score 192.

Subsequently, the QoE prediction subsystem 190 transmits the QoE score 192 to any number of software applications for evaluation of the target stream 182. Although not shown, the QoE prediction subsystem 190 may compute the QoE scores 192 for any number of the target streams 122.

Figure 3:
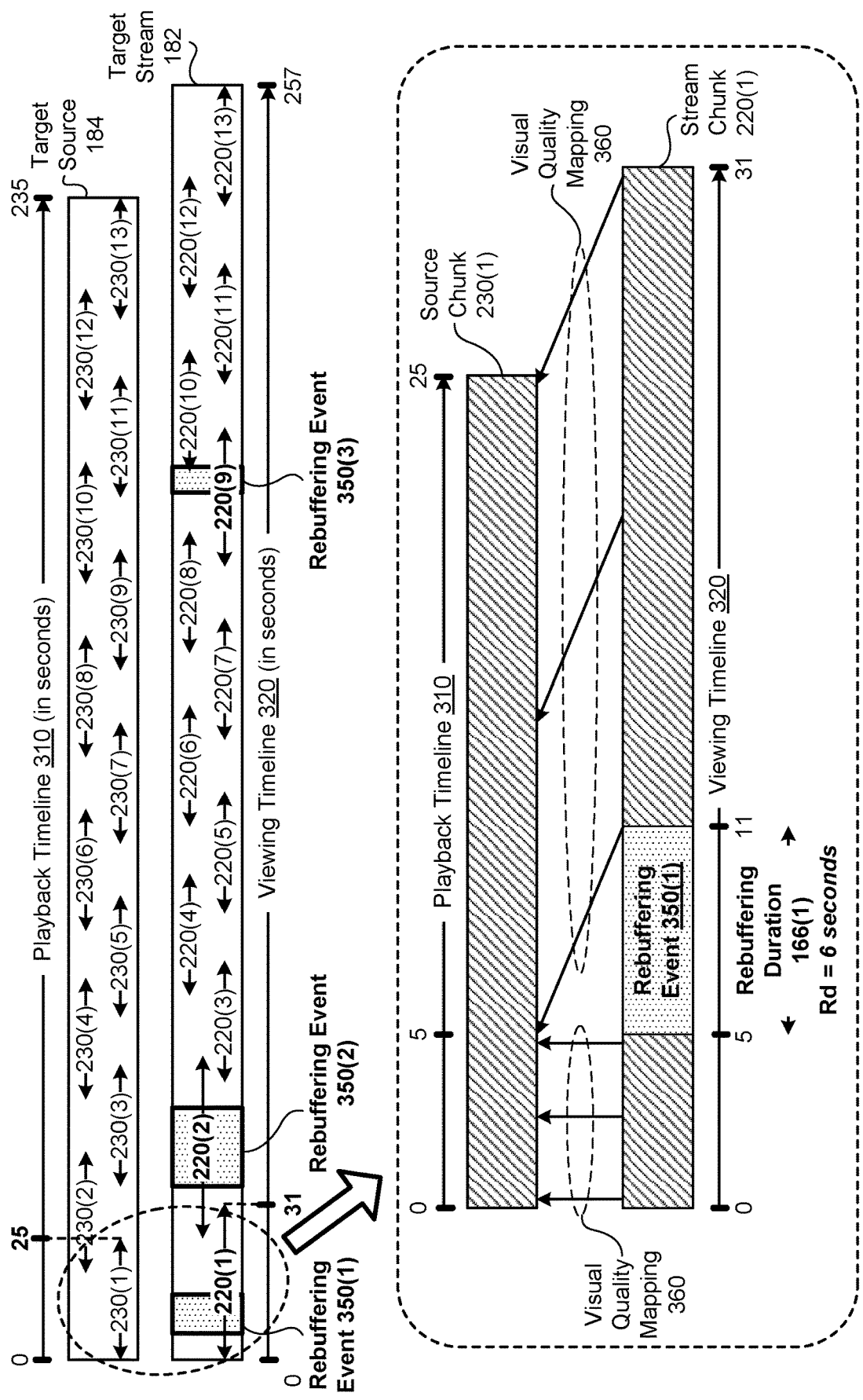
FIG. 3 is an exemplary illustration of the stream chunks and the source chunks of FIG. 2, according to various embodiments of the present invention.

FIG. 3 is an exemplary illustration of the stream chunks 220 and the source chunks 230 of FIG. 2, according to various embodiments of the present invention. For explanatory purposes only, the playback duration of the target source 184 is 235 seconds, the training playback duration 126 is 25 seconds, and the chunk overlap 212 is 5 seconds.

The source chunks 230 are depicted relative to a playback timeline 310 (in seconds) that depicts the time order of the frames included in the target source 184. More precisely, the position of the start of the source chunk 230(x) along the playback timeline 310 is equal to the total number of frames included in the previous source chunks 230(1)-230(x-1) divided by the frame rate (e.g., 30 frames per second). Because the playback duration of the target source 184 is 235 seconds, the training playback duration 126 is 25 seconds, and the chunk overlap 212 is 5 seconds, the chunking engine 210 generates thirteen source chunks 230(1)-230(13). Together and in an overlapping fashion, the source chunks 230(1)-230(13) span the playback timeline 310 that starts at 0 seconds and ends at 235 seconds. Further, each the source chunks 230 has a playback duration of approximately 25 seconds and a 5-second overlap with the immediately adjacent source chunk(s) 230.

As shown, along the playback timeline 310, the source chunk 230(1) starts at 0 seconds, overlaps with the source chunk 230(2) from 20 to 25 seconds, and ends at 25 seconds. The source chunk 230(2) starts at 20 seconds, overlaps with the source chunk 230(2) from 20 to 25 seconds, overlaps with the source chunk 230(3) from 40 to 45 seconds, and ends at 45 seconds. The source chunk 230(13) starts at 210 seconds, overlaps with the source chunk 230(12) from 210 seconds to 215 seconds, and ends at 235 seconds.

As described previously herein in conjunction with FIG. 2, the total number of stream chunks 220 is equal to the total number of source chunks 230. Additionally, the encoded video content included in the stream chunk 220(x) is derived from the video content included in the source chunk 230(x). However, each of the stream chunks 220 may also include any number (including zero) of rebuffering events 350. Each of the rebuffering events 350 is associated with a different frame and a different duration during which the displayed reconstructed video content on a client device is frozen at the frame.

For explanatory purposes only, the stream chunks 220 are shown relative to a viewing timeline 320 (in seconds) that depicts the time at which the associated frames of reconstructed video content are displayed on a client device relative to the first frame. Because each of the stream chunks 220 may include any number of the rebuffering events 350, the viewing duration of the stream chunk 220(x) may be greater than the playback duration of the source chunk 230(x). In particular, the viewing duration of the stream chunk 220(x) is equal to the sum of the playback duration of the source chunk 230(x) and the total duration of the rebuffering events 350 that are included in the stream chunk 220(x).

Along the viewing timeline 320, the stream chunk 220(1) starts at 0 seconds, includes the rebuffering event 350(1) that starts at 5 seconds and ends at 11 seconds, overlaps with the stream chunk 220(2) from 26 to 31 seconds, and ends at 31 seconds. The stream chunk 220(2) starts at 26 seconds, overlaps with the stream chunk 220(1) from 26 to 31 seconds, includes the rebuffering event 350(2) that starts at 32 seconds and ends at 44 seconds, overlaps with the stream chunk 220(3) from 58 to 63 seconds, and ends at 63 seconds. The stream chunk 220(3) starts at 58 seconds, overlaps with the stream chunk 220(2) from 58 seconds to 63 seconds, overlaps with the stream chunk 220(4) from 78 to 83 seconds, and ends at 83 seconds.

Each of the stream chunks 220(4)-220(8) and 220(10)-220(13) is uninterrupted by rebuffering events 350 and, consequently, has a viewing duration approximately equal to the training playback duration 126 of 25 seconds. By contrast, the stream chunk 220(9) includes a 4-second rebuffering event 350(3) and, consequently, has a viewing duration of approximately 29 seconds. Because the total duration of the rebuffering events 350(1)-350(3) is equal to 22 seconds, the viewing timeline 320 spans from 0 seconds to 257 seconds, ending 22 seconds after the playback timeline 310.

To illustrate how the feature extractor 150 computes the source feature set 162(1), the source chunk 230(1) and the stream chunk 220(1) are shown in greater detail. As described previously in conjunction with FIG. 2, the rebuffering analysis engine 156 computes the rebuffering duration 166($x$) for the stream chunk 220($x$) based on the rebuffering events 350 included in the stream chunk 220($x$). Because the stream chunk 220(1) includes a single rebuffering event 350(1), the rebuffering analysis engine 156 sets the rebuffering duration 166(1) equal to the 6-second duration of the rebuffering event 350(1).

As described previously in conjunction with FIG. 2, the visual quality prediction subsystem 154 computes the visual quality score 164($x$) based on comparing each frame of the source chunk 230($x$) to the playback time-aligned frame of the stream chunk 220($x$). Notably, the visual quality prediction subsystem 154 disregards frozen frames associated with rebuffering events 350. The visual quality mappings 360 illustrate mappings between the frames of the source chunk 230(1) and the playback time-aligned frames of the stream chunk 220(1). As shown, from 0 to 5 seconds along the viewing timeline 320, the frame of the stream chunk 220(1) that occurs at time x along the viewing timeline 320 is playback time-aligned to the frame of the source chunk 230(1) that occurs at time x along the playback timeline 310.

From 5 to 11 seconds along the viewing timeline 320, the 6 second rebuffering event 350(1) occurs and the stream chunk 220 is not playback time-aligned to the source chunk 230. From 11 to 31 seconds, the visual quality mappings 360 are offset by the rebuffering duration 166(1) of 6 seconds. In general, the frame of the stream chunk 220(1) that occurs at time x along the viewing timeline 320 is playback time-aligned to the frame of the source chunk 230(1) that occurs at time (x−6) along the playback timeline 310. For example, the frame of the stream chunk 220(1) that occurs at 30 seconds along the viewing timeline 320 is playback time-aligned to the frame of the source chunk 230(1) that occurs at time 24 along the playback timeline 310.

Figure 4:
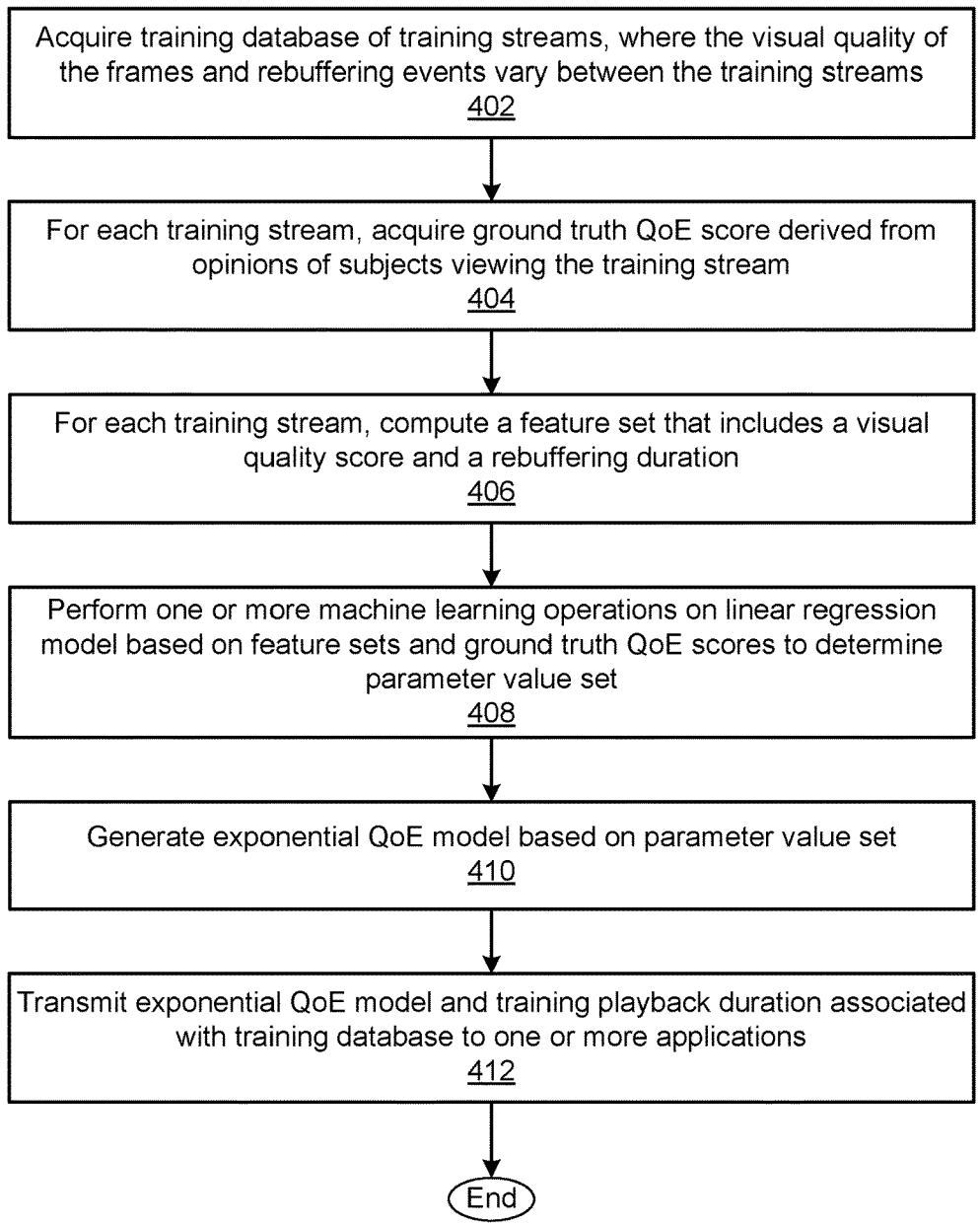
FIG. 4 is a flow diagram of method steps for generating an exponential QoE model, according to various embodiments of the present invention.

FIG. 4 is a flow diagram of method steps for generating an exponential QoE model, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 402, where the training subsystem 140 acquires the training database 120 that includes any number of the training streams 122 and the associated training sources 124. Both the visual quality of the frames and the rebuffering events 350 vary between the training streams 122. At step 404, for each of the training streams 122($x$), the training subsystem 140 acquires the ground truth QoE score 132($x$) derived from personalized QoE ratings assigned by human subjects while viewing reconstructed video content derived from the training stream 122($x$).

At step 406, for each of the training streams 122($x$), the feature extractor 150 computes a feature set 162($x$) that includes the visual quality score 164($x$) and the rebuffering duration 166($x$). At step 408, the training engine 170 performs one or more machine learning operations on the linear regression model 172 based on the feature sets 162 and the ground truth QoE scores 132 to determine the parameter value set 174. At step 410, the training subsystem 140 generates the exponential QoE model 180 based on the parameter value set 174.

In operation, the exponential QoE model 180 computes a QoE score based on the feature set 162 associated with video content that has been encoded and streamed (e.g., the target stream 182). The QoE score reflects both quality issues arising from encoding and quality issues arising from the rebuffering events 350. Accordingly, the QoE score predicts the overall QoE when viewing video content that has been encoded and streamed. At step 412, the training subsystem 140 transmits the exponential QoE model 180 and the training playback duration 126 associated with the training database 120 to any number of software applications for use in predicting the QoE when viewing video content that has been encoded and streamed. The method 400 then terminates.

Figure 5:
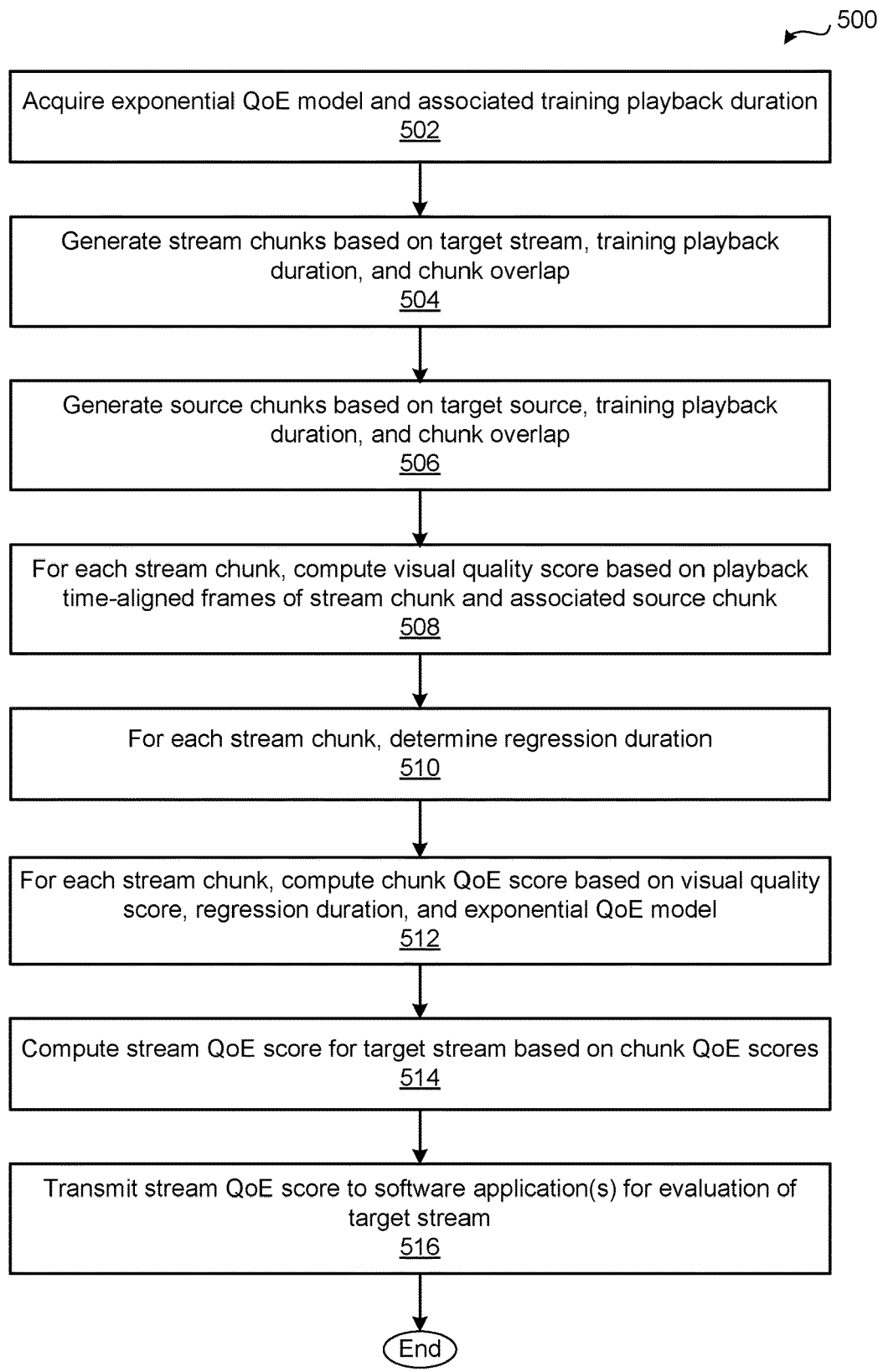
FIG. 5 is a flow diagram of method steps for predicting the QoE when viewing video content that has been encoded and streamed, according to various embodiments of the present invention.

FIG. 5 is a flow diagram of method steps for predicting the QoE when viewing video content that has been encoded and streamed, according to various embodiments of the present invention. Although the method steps are described with reference to the systems of FIGS. 1-3, persons skilled in the art will understand that any system configured to implement the method steps, in any order, falls within the scope of the present invention.

As shown, a method 500 begins at step 502, where the QoE prediction subsystem 190 acquires the exponential QoE model 180 and the training playback duration 126. At step 504, the chunking engine 210 generates the stream chunks 220 based on the target stream 182, the training playback duration 126, and the chunk overlap 212. At step 506, the chunking engine 210 generates the source chunks 230 based on the target source 184, the training playback duration 126, and the chunk overlap 212.

At step 508, for each of the stream chunks 220($x$), the visual quality prediction subsystem 154 computes the visual quality score 164($x$) based on playback time-aligned frames of the stream chunk 220($x$) and the source chunk 230($x$). At step 510, for each of the stream chunks 220($x$), the rebuffering analysis engine 156 determines the rebuffering duration 166($x$).

At step 512, for each of the stream chunks 220($x$), the QoE prediction engine 250 computes the chunk QoE score 260($x$) based on the visual quality score 164($x$), the rebuffering duration 166($x$), and the exponential QoE model 180. At step 514, the QoE aggregation engine 270 computes the steam QoE score 192 for the target stream 182 based on the chunk QoE scores 260. The stream QoE score 192 predicts the QoE as perceived by a user when viewing reconstructed video content derived from the encoded video content included in the target stream 182. Advantageously, the stream QoE score 192 reflects both the impact of the level of encoding and the impact of the rebuffering events 350 on the overall quality of experience for users during viewing sessions associated with the target stream 182. At step 516, the QoE aggregation engine 270 transmits the stream QoE score 192 to any number of software applications for evaluation of the target stream 182. The method 500 then terminates.

In sum, the disclosed techniques may be used to predict the overall quality of experience for users when viewing video content that has been encoded and steamed. In one embodiment, a training subsystem generates an exponential QoE model based on a training database, a visual quality metric, and a subjective database. The training database includes training streams having variations in both the visual quality of the encoded frames and rebuffering events. Each training stream is associated with a training source of video content having a duration that is approximately equal to a training playback duration. For each training stream, the subjective database includes a ground truth QoE score computed based on personalized QoE ratings. The personalized QoE ratings are obtained from human subjects when viewing reconstructed content derived from the training stream (including any playback interruptions associated with any rebuffering events).

For each training stream, a feature engine computes a feature set that includes a visual quality score (i.e., a value for the visual quality metric) for the encoded frames and a rebuffering duration that is equal to the duration of all rebuffering events included in the training stream. A training engine then performs machine learning operations on a linear regression model that is a linearized form of the exponential QoE model based on the feature sets and the subjective database. Subsequently, the training subsystem computes the parameter values of the exponential QoE model based on the parameter values of the trained linear regression model. In this fashion, the training subsystem indirectly trains the exponential QoE model to map a feature set for a discrete portion of a stream of encoded video content having a playback duration approximately equal to the training playback duration to a QoE score for the discrete portion of the stream of encoded video content.

Subsequently, a QoE prediction subsystem computes a QoE score for a target stream of encoded video content based on the associated target source of video content, the exponential QoE model, the visual quality metric, and the training playback duration. First, a chunking engine determines overlapping stream chunks of the target stream and overlapping source chunks of the target source based on the training playback duration and a chunk overlap. For each stream chunk, the feature extractor computes a feature set that includes a visual quality score for the visual quality metric and a rebuffering duration. A QoE prediction engine then generates a chunk QoE score for each chunk based on the associated feature set and the exponential QoE model. Finally, a QoE aggregation engine generates a QoE score for the target stream based on the chunk QoE scores.

At least one technical advantage of the disclosed techniques relative to the prior art is that the exponential QoE model predicts in a more intuitive and robust fashion the overall quality of experience for users when viewing video content that has been encoded and streamed. Notably, the exponential QoE model captures the inherent tradeoff between the visual quality of the played back video content and the duration of rebuffering events, if any, that occur during a viewing session. Accordingly, using the exponential QoE model, a software application can determine whether increasing the duration of rebuffering by x % to obtain a y % increase in a visual quality score would increase the overall quality of experience for a viewing session. Furthermore, the exponential QoE model has a lower bound, each of the parameters of the exponential QoE model has an intuitive meaning, and the accuracy and robustness of the exponential QoE model can be verified and quantified using statistical methods (e.g., bootstrapping). As a result, the exponential model has a broader applicability with respect to increasing quality of experience during video streaming than many prior art QoE models. These technical advantages represent one or more technological advancements over prior art approaches.

1. In some embodiments, a computer-implemented method comprises computing a first visual quality score associated with a stream of encoded video content; determining a first rebuffering duration associated with the stream of encoded video content; and computing an overall quality of experience (QoE) score associated with the stream of encoded video content based on the first visual quality score, the first rebuffering duration, and an exponential QoE model that is generated using a plurality of subjective QoE scores and a linear regression model, wherein the overall QoE score indicates a quality level of a user experience when viewing reconstructed video content derived from the stream of encoded video content.

2. The method of clause 1, wherein the first visual quality score comprises a value for a Video Multimethod Assessment Fusion metric or a multi-scale structural similarity index.

3. The method of clauses 1 or 2, wherein determining the first rebuffering duration comprises determining a chunk of encoded video content included in the stream of encoded video content based on a training duration associated with the exponential QoE model; and computing a total duration of one or more rebuffering events associated with the chunk.

4. The method of any of clauses 1-3, wherein computing the first visual quality score comprises determining a first portion of encoded video content included in the stream of encoded video content based on a training duration associated with the exponential QoE model; and computing a value for a visual quality metric based on a visual quality model, the first portion of encoded video content, and a second portion of video content from which the first portion of encoded video content was derived.

5. The method of any of clauses 1-4, wherein a first plurality of parameter values associated with the exponential QoE model is computed based on a second plurality of parameter values associated with the linear regression model.

6. The method of any of clauses 1-5, wherein the exponential QoE model is generated based on a version of the linear regression model that is trained using the plurality of subjective QoE scores, a plurality of rebuffering durations, and a plurality of visual quality scores.

7. The method of any of clauses 1-6, wherein the exponential QoE model includes a first parameter value for a gain factor, a second parameter value for a non-linearity visual quality factor, and a third parameter value for a rebuffering factor.

8. The method of any of clauses 1-7, wherein the exponential QoE model maps a rebuffering duration and a visual quality score to a QoE score.

9. The method of any of clauses 1-8, wherein a first subjective QoE score included in the plurality of subjective QoE scores is generated based on one or more QoE ratings that were assigned when viewing reconstructed training video content derived from training encoded video content that were interrupted by at least one rebuffering event.

10. The method of any of clauses 1-9, wherein the overall QoE score comprises a first value for a QoE metric, and further comprising generating a distribution of overall QoE scores for the QoE metric based on the first visual quality score, the first rebuffering duration, and a plurality of bootstrap QoE models, wherein each bootstrap QoE model is associated with a different subset of personalized QoE ratings.

11. In some embodiments, one or more non-transitory computer readable media include instructions that, when executed by one or more processors, cause the one or more processors to perform the steps of computing a first visual quality score based on a stream of encoded video content and a visual quality model; determining a first rebuffering duration associated with the stream of encoded video content; and computing an overall quality of experience (QoE) score associated with the stream of encoded video content based on the first visual quality score, the first rebuffering duration, the visual quality model, and an exponential QoE model that is generated using a plurality of subjective QoE scores and a linear regression model, wherein the overall QoE score indicates a quality level of a user experience when viewing reconstructed video content derived from the stream of encoded video content.

12. The one or more non-transitory computer readable media of clause 11, wherein the first visual quality score comprises a value for a Video Multimethod Assessment Fusion metric or a multi-scale structural similarity index.

13. The one or more non-transitory computer readable media of clauses 11 or 12, wherein determining the first rebuffering duration comprises determining at plurality of overlapping chunks of encoded video content included in the stream of encoded video content based on a training duration associated with the exponential QoE model; and computing a total duration of one or more rebuffering events associated with a first overlapping chunk of encoded video content included in the plurality of overlapping chunks.

14. The one or more non-transitory computer readable media of any of clauses 11-13, wherein computing the first visual quality score comprises determining a first portion of encoded video content included in the stream of encoded video content based on a training duration associated with the exponential QoE model; and computing a value for a visual quality metric based on the visual quality model, the first portion of encoded video content, and a second portion of video content from which the first portion of encoded video content was derived.

15. The one or more non-transitory computer readable media of any of clauses 11-14, wherein a first plurality of parameter values associated with the exponential QoE model is computed based on a second plurality of parameter values associated with the linear regression model.

16. The one or more non-transitory computer readable media of any of clauses 11-15, wherein each subjective QoE score included in the plurality of subjective QoE scores is associated with a different stream of encoded video content.

17. The one or more non-transitory computer readable media of any of clauses 11-16, wherein the exponential QoE model includes a first parameter value for a gain factor, a second parameter value for a non-linearity visual quality factor, and a third parameter value for a rebuffering factor.

18. The one or more non-transitory computer readable media of any of clauses 11-17, wherein the exponential QoE model maps a rebuffering duration and a visual quality score to a QoE score.

19. The one or more non-transitory computer readable media of any of clauses 11-18, wherein the overall QoE score comprises a first value for a QoE metric, and further comprising generating a distribution of overall QoE scores for the QoE metric based on the first visual quality score, the first rebuffering duration, and a plurality of bootstrap QoE models, wherein each bootstrap QoE model is associated with a different subset of encoded video streams.

20. In some embodiments, a system comprises one or more memories storing instructions; and one or more processors that are coupled to the one or more memories and, when executing the instructions, are configured to determine one or more chunks of encoded video content included in a stream of encoded video content; compute one or more visual quality scores based on the one or more chunks of encoded video content; determine one or more rebuffering durations based on the one or more chunks of encoded video content; and compute an overall quality of experience (QoE) score associated with the stream of encoded video content based on the one or more visual quality scores, the one or more rebuffering durations, and an exponential QoE model that is generated using a plurality of subjective QoE scores and a linear regression model, wherein the overall QoE score indicates a quality level of a user experience when viewing reconstructed video content derived from the stream of encoded video content.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a model that computes quality of experience (QoE) scores for reconstructed video data, the method comprising:
    for each training stream included in a plurality of training streams, computing a feature set that includes a visual quality score;
    performing one or more machine learning operations based on the plurality of feature sets and a plurality of ground truth QoE scores to determine a parameter value set; and
    generating a trained QoE model based on the parameter value set, wherein the trained QoE model computes a plurality of overall QoE scores, wherein each overall QoE score indicates a quality level of a user experience when viewing reconstructed video content derived from encoded video content, and wherein each overall QoE score is computed based on at least one visual quality score and a rebuffering duration associated with the reconstructed video content.

2. The computer-implemented method of claim 1, wherein the feature set further includes a first rebuffering duration.

3. The computer-implemented method of claim 2, wherein both the video quality scores and the first rebuffering durations vary across the plurality of training streams.

4. The computer-implemented method of claim 2, wherein the trained QoE model maps the rebuffering duration and the at least one visual quality score to an overall QoE score.

5. The computer-implemented method of claim 2, wherein the overall QoE scores reflect quality issues arising from encoding video content and quality issues arising from rebuffering events.

6. The computer-implemented method of claim 1, wherein the plurality of ground truth QoE scores is derived from a plurality of viewer ratings assigned by viewers while viewing reconstructed video content derived from the plurality of training streams.

7. The computer-implemented method of claim 1, wherein the visual quality score is associated with a visual quality metric.

8. The computer-implemented method of claim 7, wherein the visual quality metric comprises a Video Multimethod Assessment Fusion metric, a multi-scale structural similarity index, or a peak signal-to-noise ratio.

9. The computer-implemented method of claim 1, wherein the one or more machine learning operations are performed on a linear regression model.

10. The computer-implemented method of claim 1, wherein the parameter value set includes a first parameter value for a gain factor, a second parameter value for a non-linearity visual quality factor, and a third parameter value for a rebuffering factor.

11. One or more non-transitory computer-readable media including instructions that, when executed by one or more processors, cause the one or more processors to perform the steps of:
    for each training stream included in a plurality of training streams, computing a feature set that includes a visual quality score and a rebuffering duration;
    performing one or more machine learning operations based on the plurality of feature sets and a plurality of ground truth quality of experience (QoE) scores to determine a parameter value set; and
    generating a trained QoE model based on the parameter value set, wherein the trained QoE model computes a plurality of overall QoE scores that reflect quality issues that arise when viewing reconstructed video content, and wherein each overall QoE score is computed based on at least one visual quality score and a first rebuffering duration associated with the reconstructed video content.

12. The one or more non-transitory computer-readable media of claim 11, wherein both the video quality scores and the rebuffering durations vary across at least two training streams included in the plurality of training streams.

13. The one or more non-transitory computer-readable media of claim 11, wherein the trained QoE model maps the first rebuffering duration and the at least one visual quality score to an overall QoE score.

14. The one or more non-transitory computer-readable media of claim 11, wherein the overall QoE scores reflect quality issues arising from encoding streams of video data and quality issues arising from rebuffering events.

15. The one or more non-transitory computer-readable media of claim 11, wherein a first ground truth QoE score included in the plurality of ground truth QoE scores is based on at least one viewer rating that was assigned when viewing reconstructed video content derived from encoded video content that was interrupted by at least one rebuffering event.

16. The one or more non-transitory computer-readable media of claim 11, wherein the visual quality score is associated with a visual quality metric.

17. The one or more non-transitory computer-readable media of claim 16, wherein the visual quality metric comprises a Video Multimethod Assessment Fusion metric, a multi-scale structural similarity index, or a peak signal-to-noise ratio.

18. The one or more non-transitory computer-readable media of claim 11, wherein the one or more machine learning operations are performed on a linear regression model.

19. The one or more non-transitory computer-readable media of claim 11, wherein the parameter value set includes a first parameter value for a gain factor, a second parameter value for a non-linearity visual quality factor, and a third parameter value for a rebuffering factor.

20. A system, comprising:
one or more memories that include instructions; and
one or more processors that are coupled to the one or more memories and, when executing the instructions, are configured to perform the steps of:
  computing a feature set that includes a visual quality score for each training stream included in a plurality of training streams;
  performing one or more machine learning operations based on the plurality of feature sets and a plurality of ground truth quality of experience (QoE) scores to determine a parameter value set; and
  generating a trained QoE model based on the parameter value set, wherein the trained QoE model computes one or more scores for a QoE metric that measures a QoE of users when viewing video content that has been encoded and streamed, and wherein each score for the QoE metric is computed based on at least one visual quality score and a rebuffering duration associated with viewing the video content.

* * * * *